US011442606B2

(12) United States Patent
Shi et al.

(10) Patent No.: US 11,442,606 B2
(45) Date of Patent: Sep. 13, 2022

(54) USER INTERFACE INTERACTION METHOD AND SYSTEM

(71) Applicant: Shanghai Bilibili Technology Co., Ltd., Shanghai (CN)

(72) Inventors: Yingxuan Shi, Shanghai (CN); Lulu Yu, Shanghai (CN); Chaoran Li, Shanghai (CN); Zhiwei Chen, Shanghai (CN); Longwen Gao, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 17/180,026

(22) Filed: Feb. 19, 2021

(65) Prior Publication Data

US 2021/0263625 A1  Aug. 26, 2021

(30) Foreign Application Priority Data

Feb. 25, 2020 (CN) .......................... 202010115402.1

(51) Int. Cl.
```
G06F 3/048       (2013.01)
G06F 3/0484      (2022.01)
G06V 20/40       (2022.01)
```
(52) U.S. Cl.
CPC ............ *G06F 3/0484* (2013.01); *G06V 20/40* (2022.01)

(58) Field of Classification Search
CPC .......................... G06F 3/0484; G06K 9/00711
See application file for complete search history.

(56) References Cited

U.S. PATENT DOCUMENTS

| 7,956,847 | B2 * | 6/2011 | Christie | G06F 3/0486 |
| | | | | 345/173 |
| 8,243,017 | B2 * | 8/2012 | Brodersen | H04N 21/4312 |
| | | | | 345/158 |
| 9,928,029 | B2 * | 3/2018 | Brown | G06F 3/165 |
| 10,506,198 | B2 * | 12/2019 | Maliuk | G06K 9/2081 |
| 11,051,067 | B1 * | 6/2021 | Baxter | G06Q 20/385 |
| 2013/0227603 | A1 | 8/2013 | Bosworth et al. | |
| 2017/0068402 | A1 * | 3/2017 | Lochhead | G06F 3/0482 |
| 2018/0316962 | A1 * | 11/2018 | Prakash | H04N 21/47217 |
| 2019/0005981 | A1 * | 1/2019 | Belliveau | G11B 27/031 |
| 2019/0114064 | A1 * | 4/2019 | Monibi | G06F 3/0488 |
| 2019/0342622 | A1 * | 11/2019 | Carrigan | H04N 7/18 |

(Continued)

FOREIGN PATENT DOCUMENTS

CN        105812942 A      7/2016
CN        105847998 A      8/2016

(Continued)

*Primary Examiner* — David Phantana-angkool
(74) *Attorney, Agent, or Firm* — BakerHostetler (57) ABSTRACT

The present disclosure describes techniques for implementing user interface interaction. The disclosed techniques comprise playing a video on an interface; monitoring user input performed on the interface; determining a target frame based at least in part on the user input; determining a location where the user input is performed on the interface; determining whether the location of the user input is in a predetermined area of the target frame, wherein the predetermined area is associated with at least one object in the target frame; and implementing an operation associated with the at least one object in response to determining that the location of the user input is in the predetermined area of the target frame.

20 Claims, 9 Drawing Sheets

(56) References Cited

U.S. PATENT DOCUMENTS

| | | | | |
|---|---|---|---|---|
| 2020/0021789 A1* | 1/2020 | Thielen | ............ | H04N 21/4325 |
| 2020/0066305 A1* | 2/2020 | Spence | ............ | H04N 21/8549 |
| 2020/0301575 A1* | 9/2020 | Lindholm | ........... | G06F 3/04817 |
| 2020/0379730 A1* | 12/2020 | Graham | .................. | G06F 3/167 |
| 2021/0127170 A1* | 4/2021 | Chesson | ........... | H04N 21/4316 |

FOREIGN PATENT DOCUMENTS

| CN | 107888932 A | 4/2018 |
|---|---|---|
| CN | 109040780 A | 12/2018 |
| CN | 109947988 A | 6/2019 |
| CN | 110505512 A | 11/2019 |

\* cited by examiner

Fig. 6 ball ball everyone triple hit!!!

Hand injury not healed hey

Fig. 7

Japanese funny life

Your like, favorite and repost~ are my motivation for updating!

Remember special attention

USER INTERFACE INTERACTION METHOD AND SYSTEM

CROSS-REFERENCE TO RELATED APPLICATION

The present application claims priority of the Chinese patent application with number CN 202010115402.1, filed on Feb. 25, 2020, entitled "User interface interaction method and system". Entire content of the Chinese patent application is incorporated in the present application by reference.

BACKGROUND

In recent years, users have more interaction with electronic devices such as a tablet computer, a mobile phone, and a television. For example, content such as a movie or a television program is accessed by installing a content application program on the electronic device. To enhance interaction, the content application provides various function buttons such as repost, favorite, and coin.

SUMMARY

The purpose of the embodiment of the present application is to provide a user interface interaction method, system, computing device, and computer-readable storage medium, which are used to solve the problems of low interaction efficiency and poor user experience.

An aspect of the embodiment of the present application provides a user interface interaction method, the method includes: playing a target video in a video playback area, wherein the target video comprises at least one video frame; monitoring a click event in the video playback area; determining a target video frame corresponding to the click event, wherein the target video frame is located in the at least one video frame; determining an event location of the click event; determining whether the click event is located in a target area of a target object in the target video frame according to the event location of the click event; and performing a forward excitation operation associated with the target object when the click event is located in the target area of the target object.

Optionally, further including: obtaining video frame information of each video frame of the target video; wherein the video frame information of each video frame comprises object type information, location information, and timestamp information of at least one object in a corresponding video frame.

Optionally, the obtaining video frame information of each video frame of the target video includes: receiving object information of each object of the target video provided by a server; and the object information comprises object type information, location information, and timestamp information of a corresponding object, wherein when several objects with the same type are respectively located at adjacent positions of several consecutive video frames in a one-to-one correspondence, the object information of the several objects with the same type is stored in a single array, the single array comprises object type information of the several objects with the same type, average location information of the several objects with the same type in the several consecutive video frames, first frame time information of the several consecutive video frames, and last frame time information of the several consecutive video frames; and associating object information of each object of the target video with one or more corresponding video frames, to obtain the video frame information of the each video frame.

Optionally, the object information of each object of the target video is obtained by performing object recognition on the each video frame by using an object recognition model.

Optionally, the determining a target video frame corresponding to the click event includes: determining the target video frame corresponding to the click event according to event time of the click event and play time of the target video.

Optionally, the determining whether the click event is located in a target area of a target object in the target video frame according to the event location of the click event includes: determining whether the click event is located in the target area of the target object according to the event location of the click event and target location information of the target object; wherein the target location information of the target object is configured to indicate the target area.

Optionally, the performing a forward excitation operation associated with the target object when the click event is located in the target area of the target object comprises: determining a target object type of the target object; and performing the forward excitation operation associated with the target object type of the target object according to the target object type of the target object.

An aspect of the embodiment of the present application further provides a user interface interaction system, the user interface interaction system includes: a playing module, playing a target video in a video playback area, wherein the target video comprises at least one video frame; a monitoring module, monitoring a click event in the video playback area; a first determining module, determining a target video frame corresponding to the click event, wherein the target video frame is located in the at least one video frame; a second determining module, determining an event location of the click event; a determining module, determining whether the click event is located in a target area of a target object in the target video frame according to the event location of the click event; and an executing module, performing a forward excitation operation associated with the target object when the click event is located in the target area of the target object.

An aspect of the embodiment of the present application further provides a computing device, which comprises a memory, a processor, and a computer program that stored in the memory and operable on the processor, wherein the processor executes the computer programs for implementing the steps of the user interface interaction method described above.

An aspect of the embodiment of the present application further provides a computer-readable storage medium, which stores computer programs, and the computer programs can be executed by at least one processor, to cause the at least one processor to implement the steps of the user interface interaction method described above.

The user interface interaction method, system, device, and computer-readable storage medium provided by the embodiments of the present application enable the user to directly click on the target object to complete the corresponding forward excitation operation when watching a target object in the video playback screen, which not only improves the convenience of interface interactive operations, but also increases the fun and immersion of the video. The present application avoids the steps of exiting the full-screen mode or partially appearing specified interactive windows/buttons during interactive operations, and effectively improves the efficiency of interactive operations and the user experience.

DETAILED DESCRIPTION OF ILLUSTRATIVE EMBODIMENTS

When a user performs an interactive operation by using function buttons, such as favorite, repost, coin, and so on, the existing techniques require at least the following steps: exiting a full-screen mode or partially displaying specified interactive window/button through the interactive operation; and finding the foregoing function buttons and performing corresponding forward excitation operation based on the foregoing function buttons, such as like, favorite, and coin, etc. in the case of exiting the full-screen mode or partially displaying specified interactive window/button. The foregoing interaction operation requires a step of exiting the full-screen mode or partially displaying specified interactive window/button, resulting in low interaction efficiency and poor user experience.

The present disclosure effectively improves interaction efficiency and user experience. Technical solutions and advantages of the present disclosure are described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly. In addition, the technical solutions in the embodiments can be combined with each other, but must be based on the realization of those ordinary skilled in the art, when the combinations of the technical solutions are contradictory or unrealizable, it shall be deemed that the combinations of the technical solutions do not exist and are not within the protection scope required by the present application.

Figure 1:
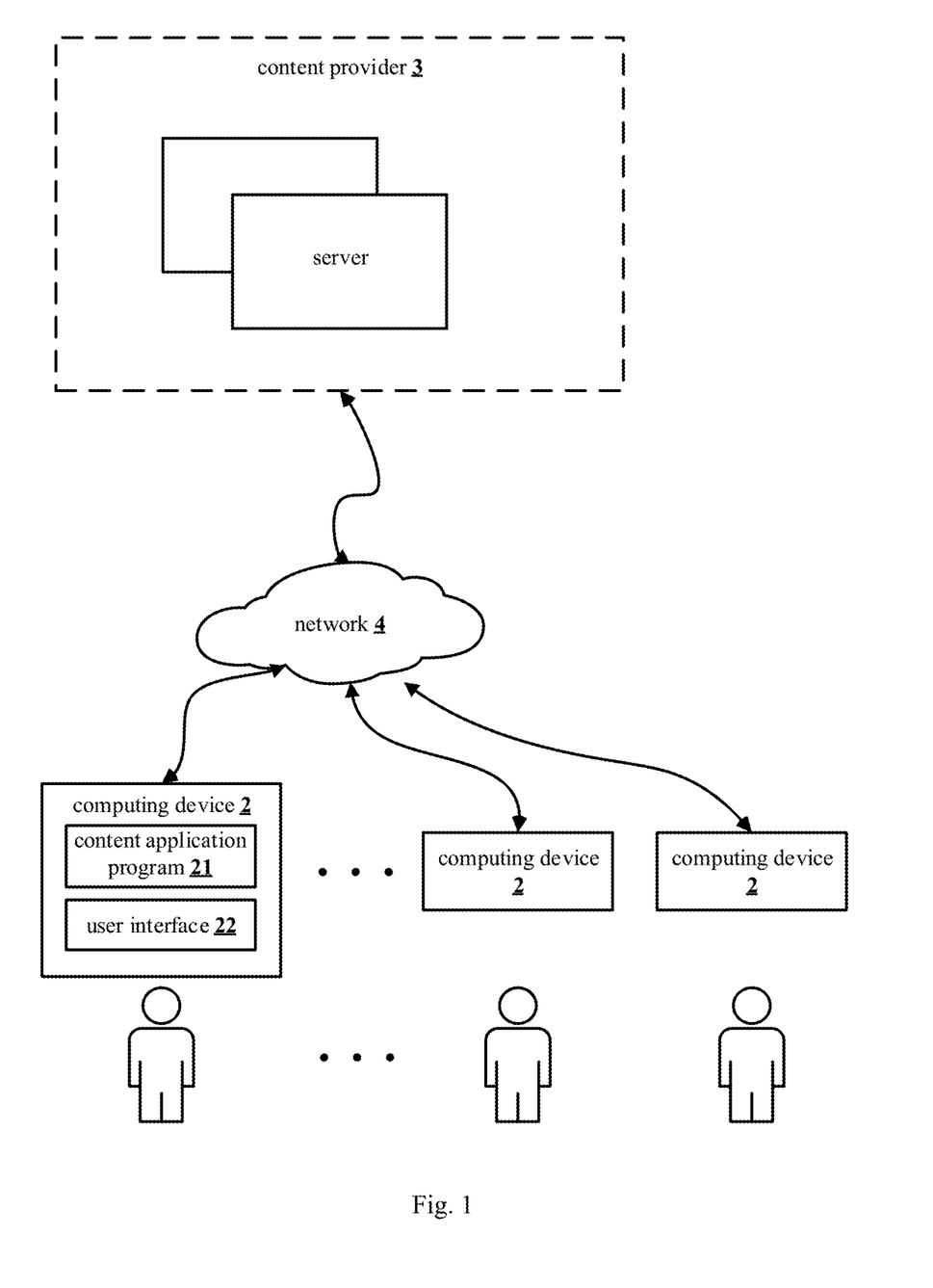
FIG. 1 schematically shows an application environment diagram of a user interface interaction method according to an embodiment of the present application.

FIG. 1 schematically shows an application environment diagram of a user interface interaction method according to an embodiment of the present application. In an exemplary embodiment, a content provider 3 may connect a plurality of computing devices 2 through a network 4.

The content provider 3 can provide services through one or more networks 4. The network 4 may include various network devices, such as routers, switches, multiplexers, hubs, modems, bridges, repeaters, firewalls, proxy devices, and/or the like. The network 4 may include physical links, such as coaxial cable links, twisted pair cable links, optical fiber links, combinations thereof, and/or the like. The network 4 may include wireless links, such as cellular links, satellite links, Wi-Fi links, and/or the like.

The content provider 3 may be composed of a plurality of servers to provide online information browsing services and media stream data for a computing device 2, and the media stream data includes audio stream data or video stream data. The plurality of the servers may include virtualized computing instances. The virtualized computing instances may include virtual machines, such as computer system simulations, operating systems, servers, and so on. A server may load a virtual machine based on a virtual image and/or other data defining specific software (eg, an operating system, a dedicated application, a server) used for simulation. As the requirements for different types of processing services change, different virtual machines can be loaded and/or terminated on one or more servers and a hypervisor can be implemented to manage the use of different virtual machines on the same server.

The computing device 2 can be configured to access the content and services of the content provider 3. The computing device 2 may include any type of computing devices, such as a mobile device, a tablet device, a laptop computer, a set-top box, a smart TV, and the like.

The computing device 2 may be associated with one or more users. A user may use one or more of the computing devices 2 to access the content provider 3. The computing device 2 may access the content provider 3 using different networks.

The computing device 2 may be installed with a content application program (eg, a video player) 21 to access content or media (eg, movies, TV programs, etc.). The content may be presented in a page format, and may include video, audio, comment, text data and/or the like. The computing device 2 may include a user interface 22, which may include input element. For example, the input element may be configured to receive user instructions, which may cause the computing device 2 to perform various operations.

Embodiment 1

Figure 2:
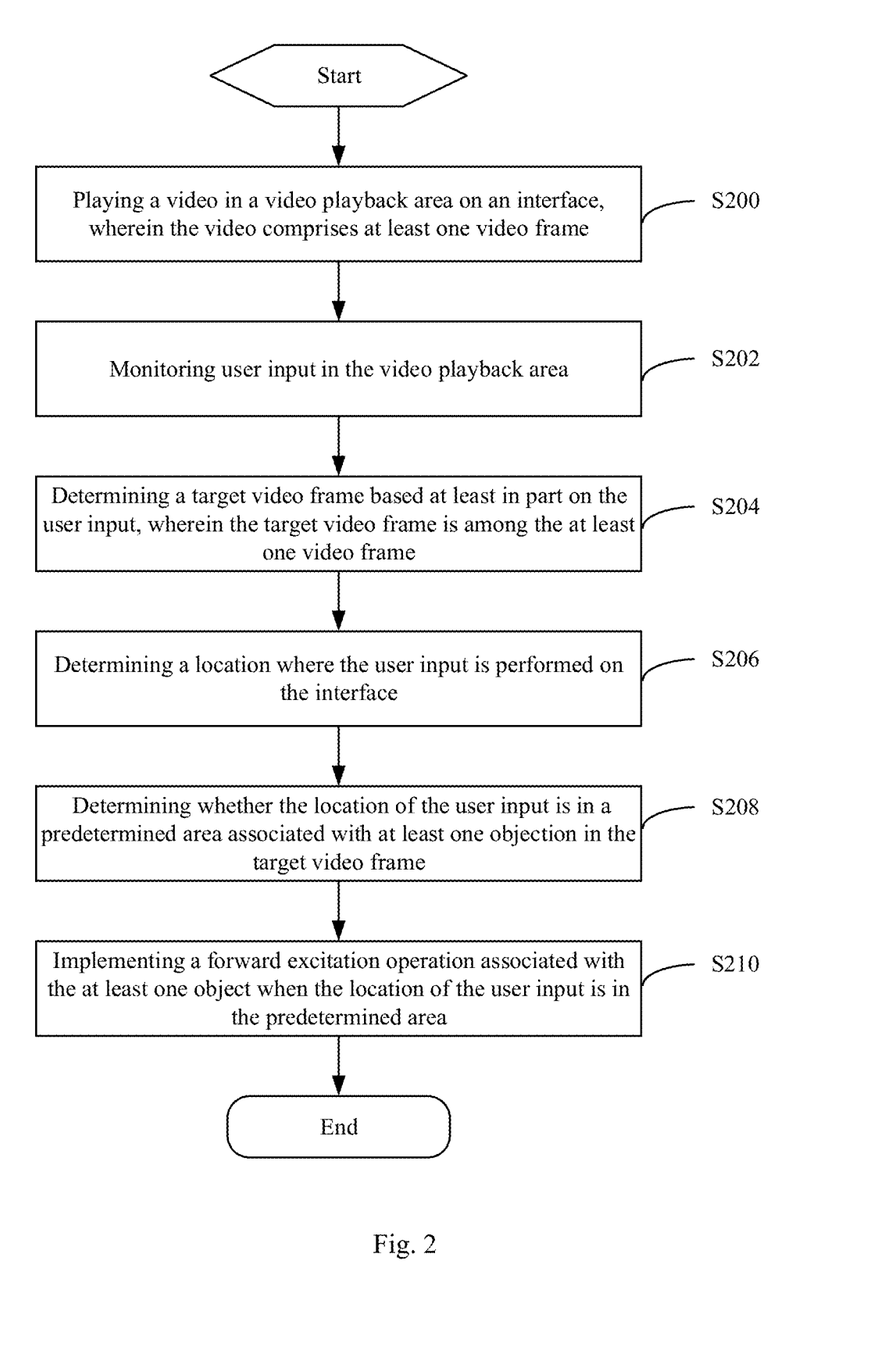
FIG. 2 schematically shows a flowchart of a user interface interaction method according to a first embodiment of the present application.

FIG. 2 schematically shows a flowchart of a user interface interaction method according to embodiment 1 of the present application. It can be understood that the flowchart in the embodiment of the method is not used to limit the order of execution of the steps. The following exemplarily describes the computing device 2 as the execution subject.

As shown in FIG. 2, the user interface interaction method can include steps S200~S210, wherein:

Step S200, playing a video in a video playback area on an interface, wherein the video comprises at least one video frame.

Figure 3:
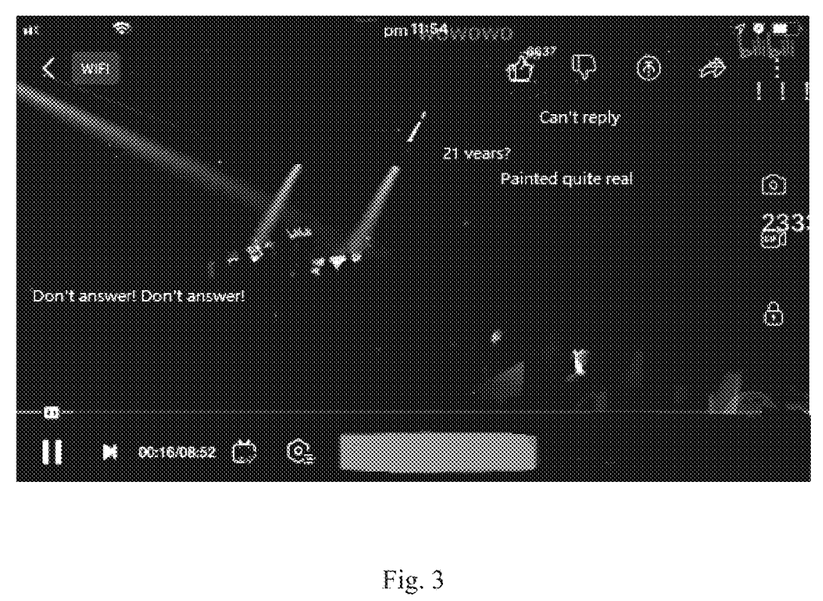
FIG. 3 is a schematic diagram showing an interactive operation interface in the prior art.

Many video platforms are equipped with function buttons such as "like", "favorite" and "repost". Users can collect and share favorite works through these function buttons, and bring more popularity and traffic to creators. Taking bilibili as an example, users can interact with the bilibili server through the bilibili client, such as perform "like", "coin", "collect", and the like, on a video which they like. However, to achieve the above interactive operations through the function buttons on the bilibili client, it is necessary to exit the full-screen mode or partially appearing specified interactive windows/buttons, and then perform interactive operations under the graphical interface as shown in FIG. 3, resulting in low interaction efficiency and poor user experience.

In the embodiment of the present application, objects used for forward excitation operations, such as "like" and "repost" and other patterns, can be loaded in part or all of the video frames of the video. In this way, when the user watches a certain pattern in the video playback screen, he can directly click on the pattern based on input elements such as a mouse or a touch screen to complete a corresponding forward excitation operation, which not only improves the convenience of interface interactive operations, but also increases the fun and immersion of the video. The target video belongs to the type of video, and some of video frames of the target video have one or more objects, such as the "like" pattern, "coin" pattern and "favorite" pattern shown in FIGS. 4 and 5, the three-link pattern of "like+coin+favorite" shown in FIG. 6, the text pattern of "ball ball everyone triple hit!!!" shown in FIG. 7, and the text pattern of "like", "repost" "favorite" and "special attention" shown in FIG. 8.

The one or more objects may be actively added to the target video by the video provider, may be added to the target video by the content provider 3, or of course, may also be added to the target video by the computing device 2.

Step S202, monitoring user input, such as a click event, performed in the video playback area.

The click event refers to an event generated based on a click operation.

The computing device 2 can receive event information from a peripheral device interface through an event monitor, such as event information of a click event. The event information of the click event may include event information of the click event triggered on the touch screen, event information of the click event triggered by a mouse, or event information of the click event triggered on other peripheral devices. The event monitor is a functional component used to monitor input operations of the keyboard, the mouse, the touch screen, etc.

Step S204, determining a target frame based at least in part on the user input, wherein the target video frame is among the at least one video frame.

Figure 9:
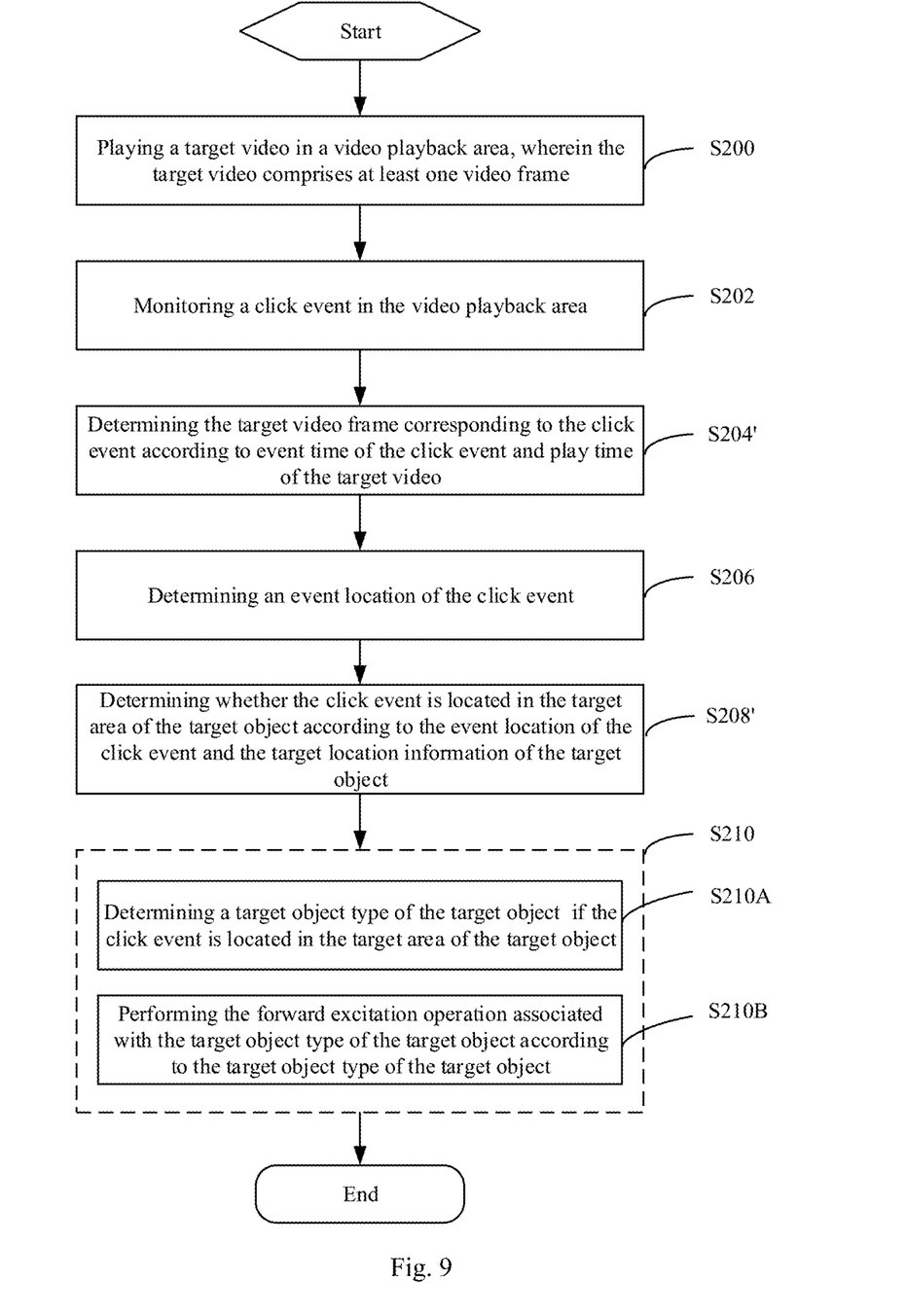
FIG. 9 schematically shows another flowchart of the user interface interaction method according to the first embodiment of the present application.

The event information of the click event includes event time of the click event. The event time of the click event is the same or corresponding to playback time (for example, the current playback time corresponding to the playback progress bar of the content application) of the target video played in the content application. In an exemplary embodiment, in order to effectively determine the target video frame corresponding to the click event, as shown in FIG. 9, the step S204 includes step S204': determining the target video frame corresponding to the click event according to event time of the click event and play time of the target video. That is, the computing device 2 can determine that the click action of the click event acts on which video frame or frames of the target video according to the event time of the click event, and determine this or these video frames as the target video frame. The above method can effectively improve the determining efficiency and accuracy of the target video frame. It should be noted that the present application is not limited to determine the target video frame in other ways.

Step S206, determining a location where the user input is performed on the interface.

The information of the user input, e.g., the click event includes the event location of the click event.

The event location may include an actual coordinate of the click event and a relative position of the click event in the target video frame.

Step S208, determining whether the location of the user input is in a predetermined area of the target video frame. The predetermined area is associated with at least one object in the target video frame.

The at least one object may be a pattern, icon, or button associated with a function, such as "like", "repost", "coin", "Favorite", etc.

The predetermined area of the at least one object is sub-areas of the video screen where these patterns are located or around. For example, if the target object is a "like" pattern, the target area of the target object is a sub-region of the video screen where the "like" pattern is located.

Example 1: the target object can be obtained by performing real-time recognition on the target video frame by the computing device 2, and correspondingly, relevant information (target object type, target location information, etc.) of the target object is obtained by the computing device 2 in real time.

Example 2: The target object may be obtained by pre-recognizing the target video frame by other devices, and correspondingly, the relevant information (target object type, target location information, etc.) of the target object is obtained in advance by other devices.

In an exemplary embodiment, in order to effectively determine whether the click event is located in the target area of the target object, as shown in FIG. 9, the step S208 includes step S208': determining whether the click event is located in the target area of the target object according to the event location of the click event and the target location information of the target object. Wherein, the target location information of the target object is configured to indicate the target area.

The target position information of the target object may include the following information: horizontal axis coordinates of the center point of the target object in the target video frame, vertical axis coordinates of the center point of the target object in the target video frame, radius taking the center point of the target object as the center of the circle. A circular area obtained from the above information can at least completely cover the target object. The circular area may be used as the target area of the target object.

The target position information of the target object may include the following information: the horizontal axis coordinates of the center point of the target object in the target video frame, the vertical axis coordinates of the center point of the target object in the target video frame, left offset size, right offset size, upper offset size, and lower offset size of the center point of the target object. A matrix area obtained from the above information can at least completely cover the target object. The matrix area may be used as the target area of the target object.

The above exemplarily lists the information used to describe the information of the target location information of the target object. It should be noted that the above-mentioned information is all relative values, and the information is a scaling operation of the same proportion or non-same proportion as the display size of the target video frame.

Step S210, performing a forward excitation operation associated with the at least one object in response to determining that the location of the user input is in the predetermined area of the target frame.

The forward excitation operation includes an operation that has a forward excitation effect, such as like, repost, coin, collect, and combination.

In an exemplary embodiment, as shown in FIG. 9, the step S210 may include steps S210A~S210B, wherein: the step S210A, determining a target object type of the target object; the step S210B, performing the forward excitation operation associated with the target object type of the target object according to the target object type of the target object.

Figure 4:
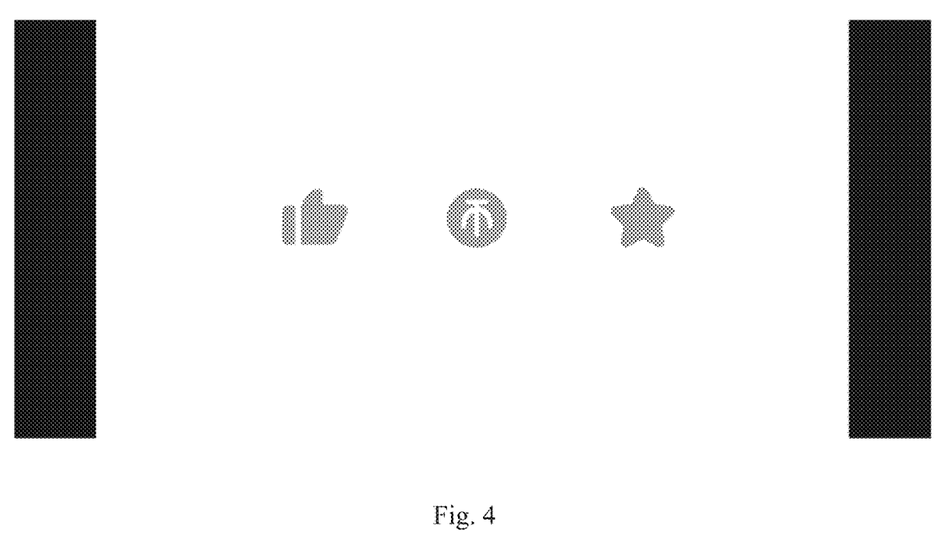
FIG. 4 is a schematic diagram showing a target video frame containing one or more objects.
Figure 5:
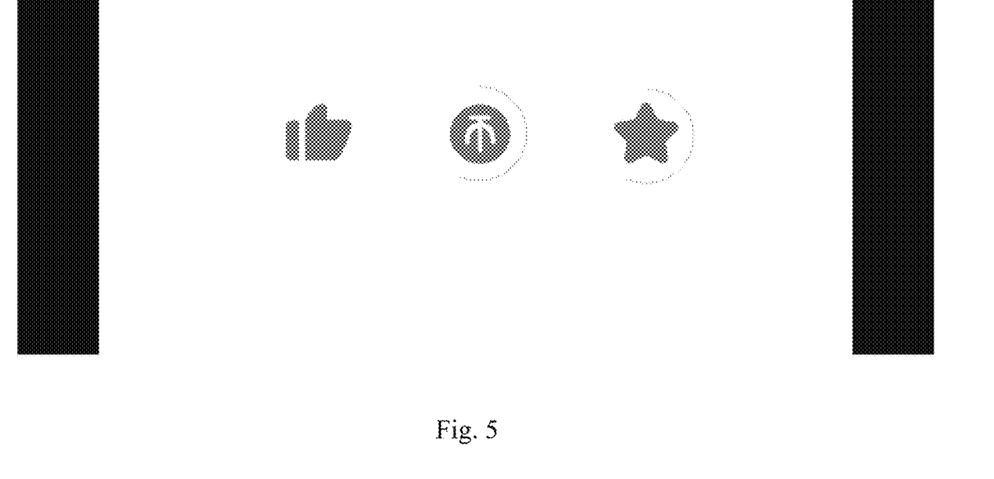
FIG. 5 is another schematic diagram showing a target video frame containing one or more objects.

For example, if the target object is the "like" pattern in FIGS. 4 and 5, and the target object type is "like", the computing device 2 performs the like operation to send like information to the content provider 3. The content provider 3 updates the number of likes of the target video according to the received like information, and sends the updated number of likes to each terminal, such as the computing device 2.

Figure 6:
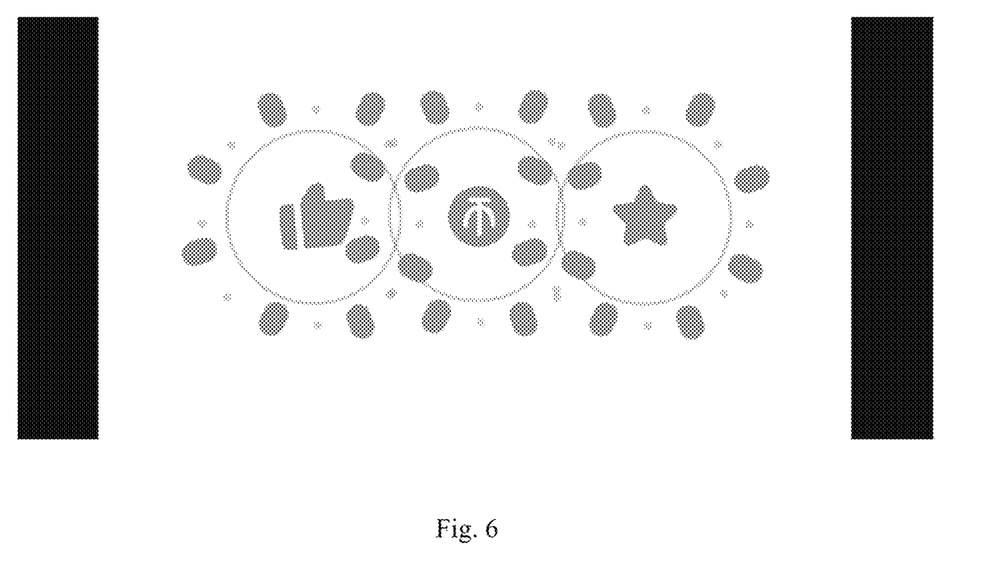
FIG. 6 is another schematic diagram showing a target video frame containing one or more objects.

For example, if the target object is the three-link pattern of "like+coin+favorite" in FIG. 6, and the target object type is "like+coin+favorite", then the computing device 2 performs the like operation, the coin operation and the favorite operation.

Figure 7:
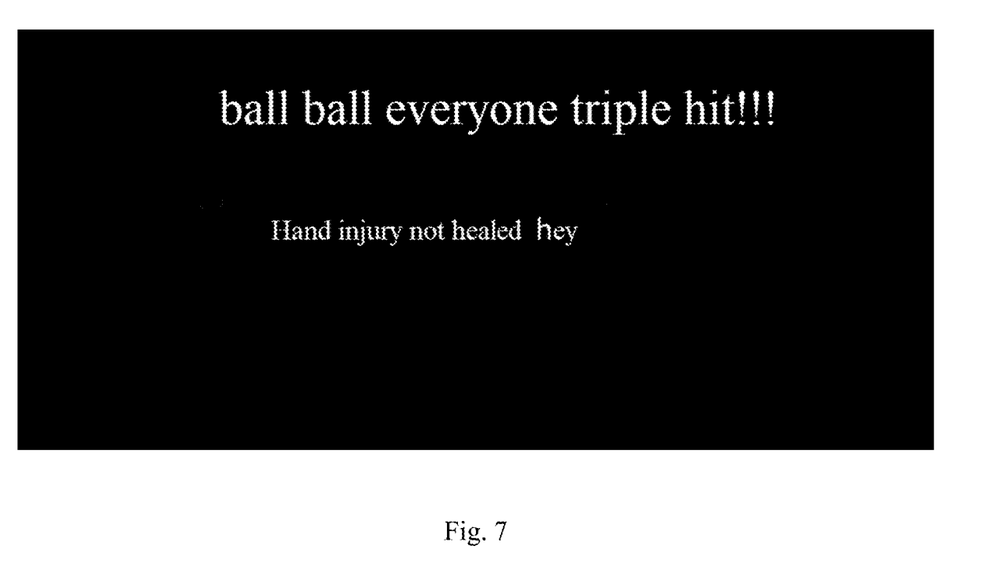
FIG. 7 is another schematic diagram showing a target video frame containing one or more objects.

For example, if the target object is the text pattern of "ball ball everyone triple hit!!!" in FIG. 7, and the target object type is "like+coin+favorite", then the computing device 2 performs the like operation, the coin operation and the favorite operation.

Figure 8:
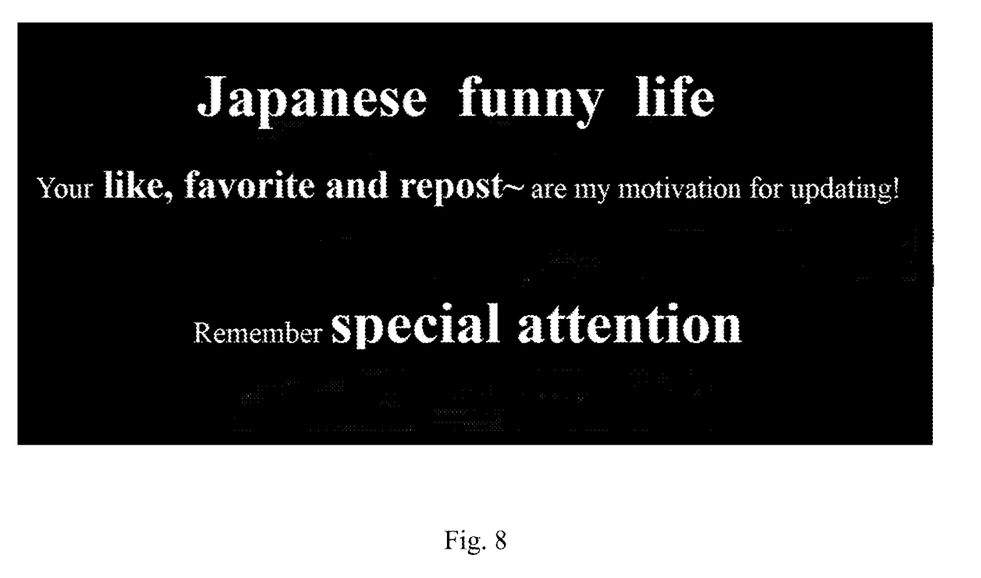
FIG. 8 is another schematic diagram showing a target video frame containing one or more objects.

For example, if the target object is the text pattern of "special attention" in FIG. 8, and the target object type is "special attention", then the computing device 2 performs a feature attention operation, such as adding video information of the target video or the UP master to a special attention list.

For example, if the target object is the pattern of "repost" (not shown), and the target object type is "repost", then the computing device 2 performs the forwarding operation. For example, the computing device 2 generates a page carrying the relevant information about the target video, and sends the page to other clients through the content application, or sends the page to the other clients through a third-party program (e.g., an email program, a chat program).

Through the above-mentioned user interface interaction method, when the user watches a target object (such as a "like" pattern) in a playback screen of the target video, he can directly click on the target object based on input elements such as a mouse or touch screen, to complete the corresponding forward excitation operation, which not only shortens the interaction steps and improves the convenience of interface interaction operations, but also increases fun and integration of the video. Without exiting the full-screen mode or partially appearing specified interactive windows/buttons or even interrupt the playback of the target video, forward excitation operations such as like, repost, and favorite can be completed. The embodiment effectively improves the efficiency of interactive operation and the user experience. In addition, the user's operating time in the interactive process increased by traditional interactive operations is also reduced, and the power consumed by interactive operations is effectively saved.

Since the embodiment effectively reduces the operation and time costs of the forward excitation operations such as "like", "repost", and "favorite", the probability of users appreciating the creator can be increased to a certain extent. It brings convenience to users, and brings more traffic and popularity to UP masters (providers of target videos). It can increase the forward excitation/reward interaction, thereby increasing the degree of reward feedback to the video content, forming a higher incentive for the UP master, and stimulating the benign interaction of the entire video platform user.

Embodiment 2

Figure 10:
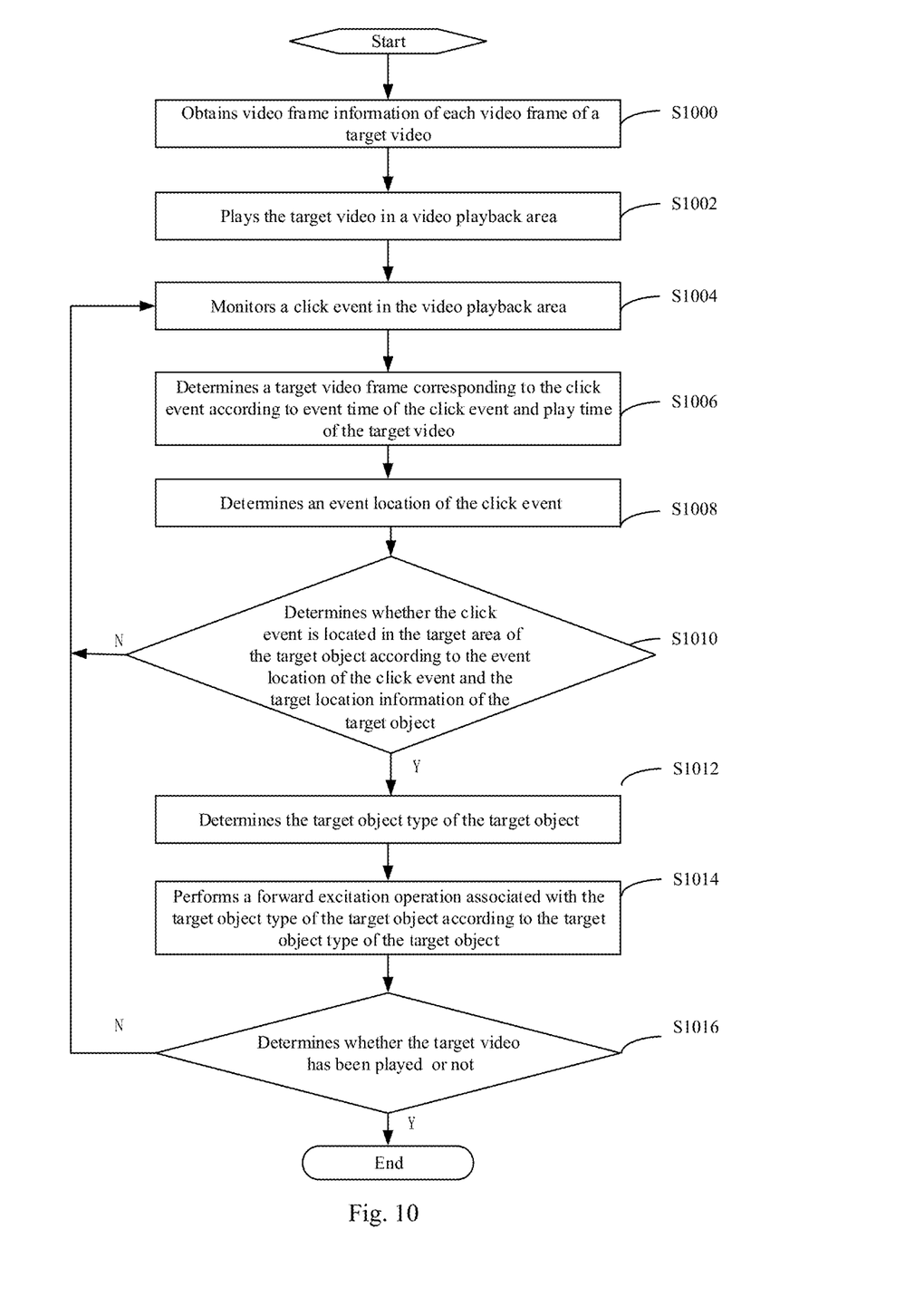
FIG. 10 schematically shows a flowchart of the user interface interaction method according to a second embodiment of the present application.
Figure 11:
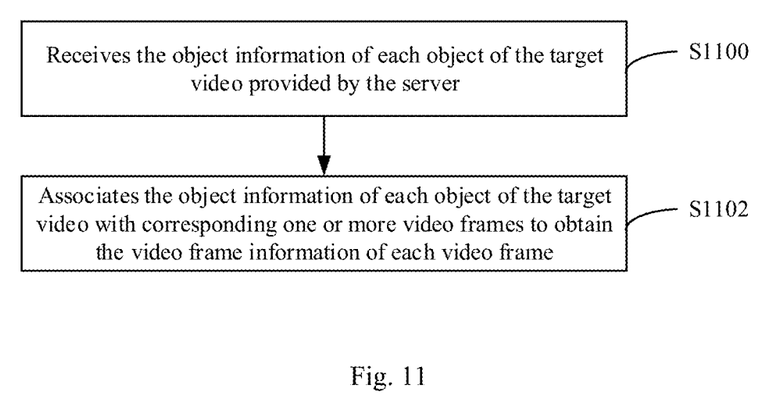
FIG. 11 is a sub-step diagram of step S500 in FIG. 5.

FIG. 10 schematically shows a flowchart of the user interface interaction method according to a second embodiment of the present application.

As shown in FIG. 10, the user interface interaction method may include steps S1000 to S1016, wherein:

Step S1000, the computing device 2 obtains video frame information of each video frame of a target video; wherein the video frame information of each video frame includes object type information, position information, and time stamp information of at least one object in a corresponding video frame.

The computing device 2 may perform a real-time recognition operation on each video frame through an object recognition model to obtain the video frame information of each video frame. The computing device 2 may also obtain the video frame information of each video frame through other devices, for example, the computing device 2 may obtain the video frame information of each video frame from the content provider 3.

In order to save the computing resources of the computing device 2, in an exemplary embodiment, as shown in FIG. 6, step S1000 may include steps S1100 to S1102. Wherein: the step S1100, the computing device 2 receives the object information of each object of the target video provided by the server (for example, the content provider 3); the step S1102: the computing device 2 associates the object information of each object of the target video with corresponding one or more video frames to obtain the video frame information of each video frame.

The object information includes object type information, location information, and timestamp information of a corresponding object, wherein when several objects with the same type are respectively located at adjacent positions of several consecutive video frames in a one-to-one correspondence, the object information of the several objects with the same type is stored in a single array, the single array comprises object type information of the several objects with the same type, average location information of the several objects with the same type in the several consecutive video frames, first frame time information of the several consecutive video frames, and last frame time information of the several consecutive video frames.

In an exemplary embodiment, the object information of each object of the target video is obtained by performing the object recognition on each video frame through an object recognition model. The object recognition model may be a YOLO (You Only Look Once) neural network model series, or a network model used for category detection and location of specific categories of objects, such as SSD (Single Shot MultiBox Detector) and Fast RCNN series.

In an exemplary embodiment, taking into account the accuracy and efficiency of the object detection algorithm, the YOLO neural network model is preferentially used in the embodiment for the object recognition operation. For a given picture, the YOLO neural network model can detect the specified type of an object and the position of the object in each video frame, and output the type of each object and the box where each object is located.

In an exemplary embodiment, if each object is inserted into the target video by the creator, each video frame of the target video needs to be detected due to the uncertainty of the creator about the insertion time and position of each object in the target video. If insertion event time of each object in the target video is continuous and more than 1 second, the general time position of the icon can be roughly determined by detecting the target video every 0.5 s. If it is detected, the detection is carried out frame by frame within 0.5 s before and after adjacent to ensure that each frame can be detected.

For example:

The target video can be recognized offline by a single device or distributed devices.

The single device or the distributed devices can detect, recognize, and locate objects in each video frame of the target video (such as "like" pattern, "repost" pattern) through the YOLOv3 neural network model, and save and upload the object type information, location information, and time stamp information of the detected object to the server (for example, the content provider 3) in a specific data format.

If several objects with the same type are respectively located in adjacent positions of several consecutive video frames in a one-to-one correspondence (they are jittered within a predetermined range), the object information of the several objects with the same type can be saved in a specific data format. For example, the object information of the several objects with the same type can be saved in the following data format (cls, x, y, r, s_pts, e_pts).

cls: the object type of the object with the same type (for example, if each of a plurality of objects is the "like" pattern, the plurality of the objects are called a plurality of objects with the same type);

x: the horizontal position of the icon (normalized);

y: the vertical position of the icon (normalized);

r: the radius containing the icon (normalized in the vertical direction);

s_pst: the time point when the first object with the same type of the plurality of the objects with the same type appears;

e_pst: the time point when the last object with the same type of the plurality of the objects with the same type appears;

For example, a "like" object appears in the center of several consecutive video frames of the target video, and the "like" object at the exact center point appears at 00:01:05.569 and ends at 00:01:10.666. The area radius of the "like" object at the center point is 0.05, the object type of the "like" object is 0, and object information of the "like" object at the exact center of several consecutive video frames can be expressed as: [0, 0.5, 0.5, 0.05, 65569, 70666]. In order to increase the stability of the front and rear video frames, the single device or the distributed devices may average the spatial position of each of the multiple objects with the same type in the corresponding video frame. Compared with separately storing the object information of the object in each video frame, the above data format can greatly save the size of the transmission data, save the transmission bandwidth, and improve the efficiency of the computing device 2 in obtaining the object information of each object of the target video.

All computing devices 2 may obtain the object information of each object of the target video from a server (for example, the content provider 3). Since the object information of each object of the target video is stored in the special data format, the computing device 2 needs to analyze the object information of each object in the target video, and restore the object information of each object obtained after analysis to each video frame of the target video according to the time stamp information in the object information of each object.

Step S1002, the computing device 2 plays the target video in a video playback area.

Some video frames of the target video have one or more objects (for example, the "like" pattern shown in FIG. 4).

Step S1004, the computing device 2 monitors a click event in the video playback area.

Step S1006, the computing device 2 determines a target video frame corresponding to the click event according to event time of the click event and play time of the target video.

The event information of the click event includes the event time of the click event.

The event time of the click event is the same or corresponding to playback time (for example, the current playback time corresponding to the playback progress bar of the content application) of the target video played in the content application. The computing device 2 can determine that the click action of the click event acts on which video frame or frames of the target video according to the event time of the click event, and determine this or these video frames as the target video frame. The above method can effectively improve the determining efficiency and accuracy of the target video frame. It should be noted that the present application is not limited to determine the target video frame in other ways.

Step S1008, the computing device 2 determines an event location of the click event.

The event information of the click event includes the event location of the click event.

The event location may include an actual coordinate of the click event and a relative position of the click event in the target video frame.

Step S1010, the computing device 2 determines whether the click event is located in the target area of the target object according to the event location of the click event and the target location information of the target object. If it is determined that the click event is located in the target area of the target object, the process proceeds to step S1012; otherwise, the process proceeds to step S1004.

As described in the step S1000, the target position information of the target object may include the following information: horizontal axis coordinates of the center point of the target object in the target video frame, vertical axis coordinates of the center point of the target object in the target video frame, radius taking the center point of the target object as the center of the circle. A circular area obtained from the above information can at least completely cover the target object. The circular area may be used as the target area of the target object.

Step S1012, the computing device 2 determines the target object type of the target object.

The identifier of each object type can be preset, and different objects correspond to different numerical identifiers. Exemplarily, if the identifier of the target object type in the target object information is "0", it is determined that the target object type is "like". If the identifier of the target object type in the target object information is "1", it is determined that the target object type is "repost".

Step S1014, the computing device 2 performs a forward excitation operation associated with the target object type of the target object according to the target object type of the target object.

Step S1016, the computing device 2 determines whether the target video has been played or not.

If it is determined that the target video has been played, the process ends; otherwise, the process enters the step S1004.

Embodiment 3

Figure 12:
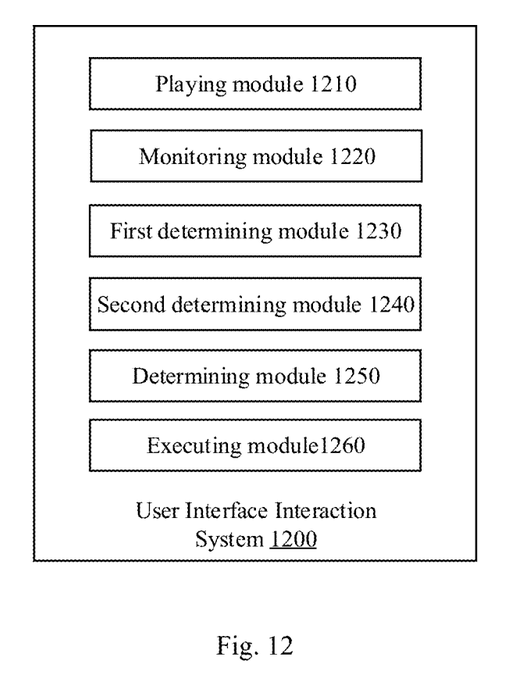
FIG. 12 schematically shows a block diagram of a user interface interaction system according to a third embodiment of the present application.

FIG. 12 schematically shows a block diagram of a user interface interaction system according to embodiment 3 of the present application. The user interface interaction system may be divided into one or more program modules, which are stored in a medium, and executed by one or more processors to implement the embodiment of the present application. The program module referred to in the embodiment of the present application refers to a series of computer program instruction segments capable of accomplishing specific functions. The following description will specifically describe the functions of the program modules of the embodiment.

As shown in FIG. 12, the user interface interaction system may include a playing module 1210, a monitoring module 1220, a first determining module 1230, a second determining module 1240, a determining module 1250, and an executing module 1260, wherein:

The playing module 1210, playing a target video in a video playback area, wherein the target video comprises at least one video frame; The monitoring module 1220, monitoring a click event in the video playback area;

The first determining module 1230, determining a target video frame corresponding to the click event, wherein the target video frame is located in the at least one video frame;

The second determining module 1240, determining an event location of the click event;

The determining module 1250, determining whether the click event is located in a target area of a target object in the target video frame according to the event location of the click event; and The executing module 1260, performing a forward excitation operation associated with the target object when the click event is located in the target area of the target object.

In an exemplary embodiment, the user interface interaction system 1200 further includes an obtaining module (not shown): obtaining video frame information of each video frame of the target video; wherein, the video frame information of each video frame includes object type information, position information, and time stamp information of at least one object in a corresponding video frame.

In an exemplary embodiment, the obtaining module further: receiving object information of each object of the target video provided by a server; and the object information comprises object type information, location information, and timestamp information of a corresponding object, wherein when several objects with the same type are respectively located at adjacent positions of several consecutive video frames in a one-to-one correspondence, the object information of the several objects with the same type is stored in a single array, the single array comprises object type information of the several objects with the same type, average location information of the several objects with the same type in the several consecutive video frames, first frame time information of the several consecutive video frames, and last frame time information of the several consecutive video frames; and associating object information of each object of the target video with one or more corresponding video frames, to obtain the video frame information of the each video frame.

In an exemplary embodiment, the object information of each object of the target video is obtained by performing object recognition on the each video frame by using an object recognition model.

In an exemplary embodiment, the first determining module 1230, further determining the target video frame corresponding to the click event according to event time of the click event and play time of the target video.

In an exemplary embodiment, the determining module 1250, further determining whether the click event is located in the target area of the target object according to the event location of the click event and target location information of the target object; wherein the target location information of the target object is configured to indicate the target area.

In an exemplary embodiment, the executing module 1260, further determining a target object type of the target object; and performing the forward excitation operation associated with the target object type of the target object according to the target object type of the target object.

Embodiment 4

Figure 13:
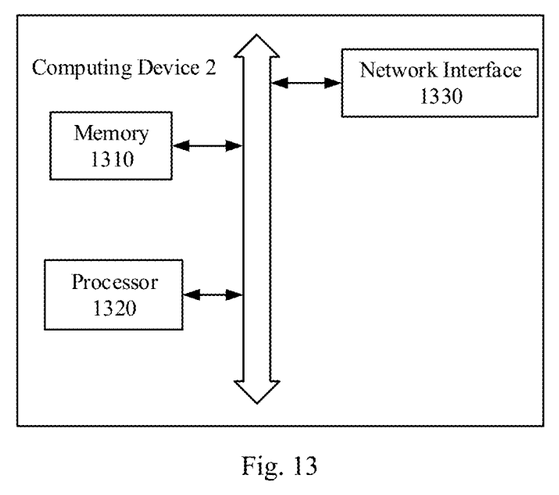
FIG. 13 schematically shows a schematic diagram of a hardware architecture of a computing device suitable for implementing the user interface interaction method according to a fourth embodiment of the present application.

FIG. 13 schematically shows a schematic diagram of the hardware architecture of the computing device 2 suitable for implementing the user interface interaction method according to a fourth embodiment of the present application. In the embodiment, the computing device 2 is a device capable of automatically performing numerical calculations and/or information processing according to predefined or stored instructions. For example, the computing device 2 can be a Smartphone, a tablet, a laptop, a desktop computer, a rack server, a blade server, a tower server, or a cabinet server (including stand-alone servers, or a cluster of multiple servers), and so on. As shown in FIG. 13, the computing device 2 includes, but is not limited to, a memory 1310, a processor 1320, and a network interface 1330 that can be communicated with each other through a system bus. Wherein:

The memory 1310 includes at least one type of computer-readable storage medium. The readable storage medium includes a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc. In some embodiments, the memory 1310 may be an internal storage module of the computing device 2 such as a hard disk or memory of the computing device 2. In other embodiments, the memory 1310 may also be an external storage device of the computing device 2, such as a plugged hard disk provided on the computing device 2, a Smart Media Card (SMC), Secure Digital (SD) card, a Flash card, and the like. Of course, the memory 1310 may also include both an internal storage module and an external storage device of the computing device 2. In the embodiment, the memory 1310 is generally used to store an operating system and various types of application software installed in the computing device 2 such as program codes of the network communication method and the like. In addition, the memory 1310 may also be used to temporarily store various types of data that have been or will be outputted.

The processor 1320, in some embodiments, may be a Central Processing Unit (CPU), a controller, a microprocessor, or other data processing chip. The processor 1320 is generally used to control the overall operation of the computing device 2 such as performing control and processing related to data interaction or communication with the computing device 2. In the embodiment, the processor 1320 is used to run program codes stored in the memory 1310 or process data.

The network interface 1330 may include a wireless network interface or a wired network interface which is generally used to establish a communication connection between the computing device 2 and other computing devices. For example, the network interface 1330 is used for connecting the computing device 2 to an external terminal via a network and establishing a data transmission channel and a communication connection between the computing device 2 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 13 shows only the computing device 2 having components 1310-1330, but it is understood that it is not required to implement all of the shown components and that more or fewer parts can be implemented in lieu thereof.

In the embodiment, the user interface interaction method stored in the memory 1310 may be divided into one or more program modules and executed by one or more processors (processor 1320 in the embodiment) to complete the present application.

Embodiment 5

The embodiment further provides a computer-readable storage medium, which stores computer programs, and when the computer programs are executed by a processor, the steps of the user interface interaction method in the embodiment are realized.

In the embodiment, the computer-readable storage medium includes a flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc. In some embodiments, the computer-readable storage medium may be an internal storage module of the computing device such as a hard disk or memory of the computing device. In other embodiments, the memory may also be an external storage device of the computing device, such as a plugged hard disk provided on the computing device, a Smart Media Card (SMC), Secure Digital (SD) card, a Flash card, and the like. Of course, the computer-readable storage medium may also include both an internal storage module and an external storage device of the computing device. In the embodiment, the computer-readable storage medium is generally used to store an operating system and various types of application software installed in the computing device such as program codes of the network communication method and the like. In addition, the memory may also be used to temporarily store various types of data that have been or will be outputted.

Apparently, it should be appreciated by those skilled in the art that each module or step described in the embodiment of the present application can be realized by a general-purpose and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method, comprising:
    playing a video on an interface, wherein the video comprises at least one frame;
    monitoring user input performed on the interface;
    determining a target frame among the at least one frame based at least in part on the user input;
    determining a location where the user input is performed on the interface;
    determining whether the location of the user input is in a predetermined area of the target frame, wherein the predetermined area is associated with at least one object in the target frame, wherein the at least one object has different types of object corresponding to different types of operation on the video, and wherein the at least one object comprises different function elements by which a user performs the different types of operation; and
    implementing a corresponding operation on the video in response to determining that the location of the user input is in the predetermined area associated with the at least one object in the target frame, wherein the corresponding operation is among the different types of operation.

2. The method of claim 1, further comprising:
    obtaining information associated with each of the at least one frame of the video, wherein the information associated with each frame comprises information indicating a type of at least one object in each frame, location information associated with the at least one object in each frame, and timestamp information associated with each frame.

3. The method of claim 2, wherein information associated with a same type of objects in consecutive frames is stored in a single array when the objects with the same type are respectively located at adjacent positions in the consecutive frames, wherein the single array comprises information indicating the same type of the objects, average location information of the objects in the consecutive frames, timestamp information of a first frame among the consecutive frames, and timestamp information of a last frame among the consecutive frames.

4. The method of claim 1, further comprising:
obtaining information associated with the at least one object in the target frame by performing object recognition on the target frame using an object recognition model.

5. The method of claim 1, further comprising:
determining the target frame based on a play time of the video and a time when the user input is performed on the interface.

6. The method of claim 1, wherein the predetermined area of the target frame is associated with a location of the at least one object in the target frame.

7. The method of claim 1, further comprising:
determining a type of the at least one object in the target frame; and
implementing the operation associated with the at least one object based on the type of the at least one object.

8. A system, comprising:
at least one processor; and
at least one memory communicatively coupled to the at least one processor and storing instructions that upon execution by the at least one processor cause the system to perform operations, the operations comprising:
playing a video on an interface, wherein the video comprises at least one frame;
monitoring user input performed on the interface;
determining a target frame among the at least one frame based at least in part on the user input;
determining a location where the user input is performed on the interface;
determining whether the location of the user input is in a predetermined area of the target frame, wherein the predetermined area is associated with at least one object in the target frame, wherein the at least one object has different types of object corresponding to different types of operation on the video, and wherein the at least one object comprises different function elements by which a user performs the different types of operation; and
implementing a corresponding operation on the video n response to determining that the location of the user input is in the predetermined area associated with the at least one object in the target frame, wherein the corresponding operation is among the different types of operation.

9. The system of claim 8, the operations further comprising:
obtaining information associated with each of the at least one frame of the video, wherein the information associated with each frame comprises information indicating a type of at least one object in each frame, location information associated with the at least one object in each frame, and timestamp information associated with each frame.

10. The system of claim 9, wherein information associated with a same type of objects in consecutive frames is stored in a single array when the objects with the same type are respectively located at adjacent positions in the consecutive frames, wherein the single array comprises information indicating the same type of the objects, average location information of the objects in the consecutive frames, timestamp information of a first frame among the consecutive frames, and timestamp information of a last frame among the consecutive frames.

11. The system of claim 8, the operations further comprising:
obtaining information associated with the at least one object in the target frame by performing object recognition on the target frame using an object recognition model.

12. The system of claim 8, the operations further comprising:
determining the target frame based on a play time of the video and a time when the user input is performed on the interface.

13. The system of claim 8, wherein the predetermined area of the target frame is associated with a location of the at least one object in the target frame.

14. The system of claim 8, the operations further comprising:
determining a type of the at least one object in the target frame; and
implementing the operation associated with the at least one object based on the type of the at least one object.

15. A non-transitory computer-readable storage medium, storing computer-readable instructions that upon execution by a processor cause the processor to implement operations comprising:
playing a video on an interface, wherein the video comprises at least one frame;
monitoring user input performed on the interface;
determining a target frame among the at least one frame based at least in part on the user input;
determining a location where the user input is performed on the interface;
determining whether the location of the user input is in a predetermined area of the target frame, wherein the predetermined area is associated with at least one object in the target frame, wherein the at least one object has different types of object corresponding to different types of operation on the video, and wherein the at least one object comprises different function elements by which a user performs the different types of operation; and
implementing a corresponding operation on the video in response to determining that the location of the user input is in the predetermined area associated with the at least one object in the target frame, wherein the corresponding operation is among the different types of operation.

16. The non-transitory computer-readable storage medium of claim 15, the operations further comprising:
obtaining information associated with each of the at least one frame of the video, wherein the information associated with each frame comprises information indicating a type of at least one object in each frame, location information associated with the at least one object in each frame, and timestamp information associated with each frame.

17. The non-transitory computer-readable storage medium of claim 16, wherein information associated with a same type of objects in consecutive frames is stored in a single array when the objects with the same type are respectively located at adjacent positions in the consecutive frames, wherein the single array comprises information indicating the same type of the objects, average location information of the objects in the consecutive frames, timestamp information of a first frame among the consecutive frames, and timestamp information of a last frame among the consecutive frames.

18. The non-transitory computer-readable storage medium of claim 15, the operations further comprising:
 obtaining information associated with the at least one object in the target frame by performing object recognition on the target frame using an object recognition model.

19. The non-transitory computer-readable storage medium of claim 15, the operations further comprising:
 determining the target frame based on a play time of the video and a time when the user input is performed on the interface.

20. The non-transitory computer-readable storage medium of claim 15, the operations further comprising:
 determining a type of the at least one object in the target frame; and
 implementing the operation associated with the at least one object based on the type of the at least one object.

\* \* \* \* \*